US008037179B2

(12) United States Patent
Wang et al.

(10) Patent No.: US 8,037,179 B2
(45) Date of Patent: Oct. 11, 2011

(54) DEVICE CONTROL SYSTEM EMPLOYING EXTENSIBLE MARKUP LANGUAGE FOR DEFINING INFORMATION RESOURCES (75) Inventors: Gang Wang, Goleta, CA (US); Matteo Contolini, Santa Barbara, CA (US); Chengyi Zheng, Goleta, CA (US); Heinz-Werner Stiller, Jestetten (DE)

(73) Assignee: Storz Endoskop Produktions GmbH (DE)

( * ) Notice: Subject to any disclaimer, the term of this patent is extended or adjusted under 35 U.S.C. 154(b) by 545 days.

(21) Appl. No.: 11/555,945

(22) Filed: Nov. 2, 2006

(65) Prior Publication Data
US 2008/0109402 A1    May 8, 2008

(51) Int. Cl.
G06F 15/16    (2006.01)
G06F 15/173    (2006.01)
G06F 15/177    (2006.01)

(52) U.S. Cl. ............ 709/225; 704/251; 704/4; 704/10; 715/204; 715/202; 715/234; 715/716

(58) Field of Classification Search .................. 709/218, 709/220, 224, 225, 230, 244, 249; 715/202, 715/234, 716; 606/1, 10, 101, 118, 539; 340/825, 3.54
See application file for complete search history.

(56) References Cited

U.S. PATENT DOCUMENTS

| | | | |
|---|---|---|---|
| 5,970,457 A | 10/1999 | Brant et al. | 704/275 |
| 6,266,635 B1 | 7/2001 | Sneh | 704/235 |
| 6,278,975 B1 | 8/2001 | Brant et al. | 704/275 |
| 6,463,361 B1 | 10/2002 | Wang et al. | 700/258 |
| 6,587,818 B2 | 7/2003 | Kanevsky et al. | 704/251 |
| 6,591,239 B1 | 7/2003 | McCall et al. | 704/275 |
| 6,601,026 B2 | 7/2003 | Appelt et al. | 704/9 |
| 6,642,836 B1 | 11/2003 | Wang et al. | 340/3.54 |
| 7,043,532 B1 * | 5/2006 | Humpleman et al. | 709/208 |
| 7,676,488 B2 * | 3/2010 | Wiest et al. | 715/204 |

(Continued)

FOREIGN PATENT DOCUMENTS

JP    2001296881 A    10/2001

(Continued)

OTHER PUBLICATIONS

European Search Report, Apr. 16, 2008, 7 Pages.

(Continued)

*Primary Examiner* — Haresh N Patel
(74) *Attorney, Agent, or Firm* — St. Onge Steward Johnston & Reens LLC (57) ABSTRACT A device control system including at least one device operable by the system, at least one processor, software executing on the at least one processor for receiving message data and determining a corresponding XML document type, software executing on the at least one processor for generating a XML document based on the XML document type, the XML document including the message data, software executing on the processor for packetizing the XML document, and two or more communication components, each communication component including an XML parser for parsing the XML document and extracting the message data.

16 Claims, 6 Drawing Sheets

U.S. PATENT DOCUMENTS

| | | | |
|---|---|---|---|
| 2002/0013710 A1 | 1/2002 | Shimakawa | |
| 2002/0183894 A1 | 12/2002 | Wang et al. | 700/245 |
| 2003/0167266 A1* | 9/2003 | Saldanha et al. | 707/6 |
| 2003/0171740 A1* | 9/2003 | Stiller et al. | 606/1 |
| 2003/0197590 A1 | 10/2003 | Wang et al. | 340/3.54 |
| 2003/0229696 A1* | 12/2003 | Klein et al. | 709/224 |
| 2004/0061713 A1* | 4/2004 | Jennings | 345/700 |
| 2004/0094632 A1* | 5/2004 | Alleshouse | 235/494 |
| 2004/0124964 A1 | 7/2004 | Wang et al. | 340/3.54 |
| 2004/0149826 A1* | 8/2004 | Alleshouse | 235/432 |
| 2004/0172011 A1 | 9/2004 | Wang et al. | 606/1 |
| 2004/0172237 A1* | 9/2004 | Saldanha et al. | 704/4 |
| 2005/0014494 A1 | 1/2005 | Owen et al. | |
| 2005/0108001 A1* | 5/2005 | Aarskog | 704/10 |
| 2005/0273508 A1* | 12/2005 | Humpleman et al. | 709/223 |
| 2006/0168635 A1* | 7/2006 | Terashima et al. | 725/110 |
| 2006/0220784 A1* | 10/2006 | Wang et al. | 340/3.54 |
| 2006/0239423 A1* | 10/2006 | Archer et al. | 379/88.18 |
| 2006/0241575 A1* | 10/2006 | Wang et al. | 606/10 |
| 2007/0115839 A1* | 5/2007 | Yang et al. | 370/251 |
| 2007/0130100 A1* | 6/2007 | Miller | 707/1 |
| 2007/0271097 A1* | 11/2007 | Abe | 704/251 |
| 2008/0062280 A1* | 3/2008 | Wang et al. | 348/231.99 |

FOREIGN PATENT DOCUMENTS

| | | |
|---|---|---|
| JP | 2002514797 T | 5/2002 |
| JP | 2002538432 T | 11/2002 |
| JP | 2003067177 A | 3/2003 |
| JP | 2007538432 T | 12/2007 |
| WO | 2005114904 A1 | 12/2005 |

OTHER PUBLICATIONS

Voicexml Forum: "Voice Extensible Markup Language—Voicexml—Version 1.00" Internet Citation, [Online] Mar. 7, 2000, XP002429310 Retrieved from the internet: URL:http://www.voicexml.org/specs/VoiceXML—100.pdf> [retrieved on Apr. 11, 2007] 101 Pages.

Dave Winer: "XML-RPC Specification" [Online] Jun. 30, 2003, pp. 1-6 XP002476838 Internet Publication Retrieved from Internet: URL:http://www.xmlrpc.com/spec>[retrieved on Apr. 16, 2008].

* cited by examiner

```
NAME
  COMMENTS           This is an example
  NAME               SESAM System
  ID                 1234567
  CREATOR            Gang Wang
  VERSION            1.2
  DEVICES
  MENU
    timeout          2
    NODE
      icon           ./images/sesam.bmp
      scope          top
      jumpto         child
      DISPLAY_TXT
      COMMAND_TXT
        langauge     am_english
        #text        SESAM
      SPEECH_TXT
      AUDIO_FEEDBACK
    NODE
    NODE
    NODE
      scope          global
      DISPLAY_TXT
      COMMAND_TXT
        langauge     am_english
        #text        QUIT
      SPEECH_TXT
      AUDIO_FEEDBACK
        FILE         ./wav/ding.wav
```

FIG. 5

```
■ NAME                          Telephone
■ ID                            1-xyzabc
■ CREATOR                       Gang Wang
■ VERSION                       1.0
■ DEVICES
■ MENU
    ◆ timeout                   2
  ■ NODE
      ◆ icon                    ./images/telephone.bmp
      ◆ scope                   device
      ◆ jumpto                  child
    ■ DISPLAY_TXT                                          500
    ■ SPEECH_TXT
    ■ AUDIO_FEEDBACK
    ■ NODE
    ■ NODE
    ■ NODE
      ■ DISPLAY_TXT
      ■ SPEECH_TXT
      ■ COMMAND_TXT
          ◆ langauge            am_english
          ◆ #text               0-9
        ■ NODE
        ■ SPEECH_TXT
        ■ COMMAND_TXT
            ◆ language          am_english
            ◆ #text             zero
          ■ AUDIO_FEEDBACK
            ■ FILE              ./wav/tone0.wav
      ■ NODE
```

FIG. 6

DEVICE CONTROL SYSTEM EMPLOYING EXTENSIBLE MARKUP LANGUAGE FOR DEFINING INFORMATION RESOURCES

FIELD OF THE INVENTION

This invention relates to device control systems, and more specifically to a device control system, such as a speech recognition command and control system, employing eXtensible Markup Language for defining information exchanged by the system.

BACKGROUND OF THE INVENTION

Device control systems are used for many applications including the control of devices in the medical, scientific and industrial fields. One type of device control system is a speech recognition command and control system.

Speech recognition is the process by which an acoustic signal received by a microphone is converted to a set of text words, numbers, or symbols by a computer. These recognized words then can be used in a variety of computer software applications for purposes such as document preparation, data entry, and command and control. A speech recognition control system may be used in modern operating rooms to control various medical systems and devices. A surgeon or other user, by giving a simple voice command, may direct the functionality of a device controlled by the speech recognition system. For example, the surgeon may deliver a voice command to adjust a patient table or adjust the pressure of a pump.

To enable speech recognition or voice-driven device control in an operating room, medical devices and/or other equipment are connected via communication channels (e.g., an Ethernet connection, device bus, etc.). A speech recognition application may also be connected providing the voice driven user interface and recognition software. When a voice command is issued, the command may be recognized and converted to a text string. If it is successfully identified as valid command corresponding to one of the connected devices or applications, the system will send an appropriate signal so that the desired control action is taken.

One critical problem with prior art device control systems, such as speech recognition command and control systems, is how to effectively define different types of information that is exchanged between different components of the system. The information may include, for example, device information, control information, system feedback information, and voice interface behavior information. The effectiveness of the control system depends on this diversified information which needs to be clearly defined and managed in order to facilitate information exchange between the different components of the system.

In prior art systems, proprietary syntax and semantics are used for defining the information resources enumerated above. This results in confusing and/or conflicting information formats that often prolong the development and deployment of the product. More importantly, it imposes critical limitations to the interoperability of different devices across a variety of systems.

It is therefore desired to provide a speech recognition system including an improved means for defining information exchange.

SUMMARY OF THE INVENTION

According, it is an object of the present invention to provide a speech recognition command and control system which employs extensible Markup Language ("XML") as a platform for defining information resources.

These and other objectives are achieved by providing a device control system including at least one device operable by the system, at least one processor, software executing on the at least one processor for receiving message data and determining a corresponding XML document type, software executing on the at least one processor for generating a XML document based on the XML document type, the XML document including the message data, software executing on the processor for packetizing the XML document, and two or more communication components, each communication component including an XML parser for parsing the XML document and extracting the message data. In some embodiments, at least one of the communication components is a command controller and the message data includes at least one command for operating at least one device.

Further provided is a device control system including at least one device controllable by the system, and two or more communication components, each communication component including a type identifier for determining an XML document type corresponding to message data based on one or more document type definitions, an XML constructor for generating a XML document including the message data based on the XML document type, a packetizer for packetizing the XML document, and an XML parser for parsing the XML document and extracting the message data based on XML syntax.

Further provided is a method for exchanging information in a device control system including the steps of receiving message data from one or more components of the device control system, determining an XML document type based on the message data, determining a document definition based on the XML document type, generating an XML document including the message data based on the document definition, packetizing the XML document, and sending the packetized XML document via a communication channel.

Other objects, features and advantages according to the present invention will become apparent from the following detailed description of certain advantageous embodiments when read in conjunction with the accompanying drawings in which the same components are identified by the same reference numerals.

DETAILED DESCRIPTION OF THE INVENTION

Figure 1:
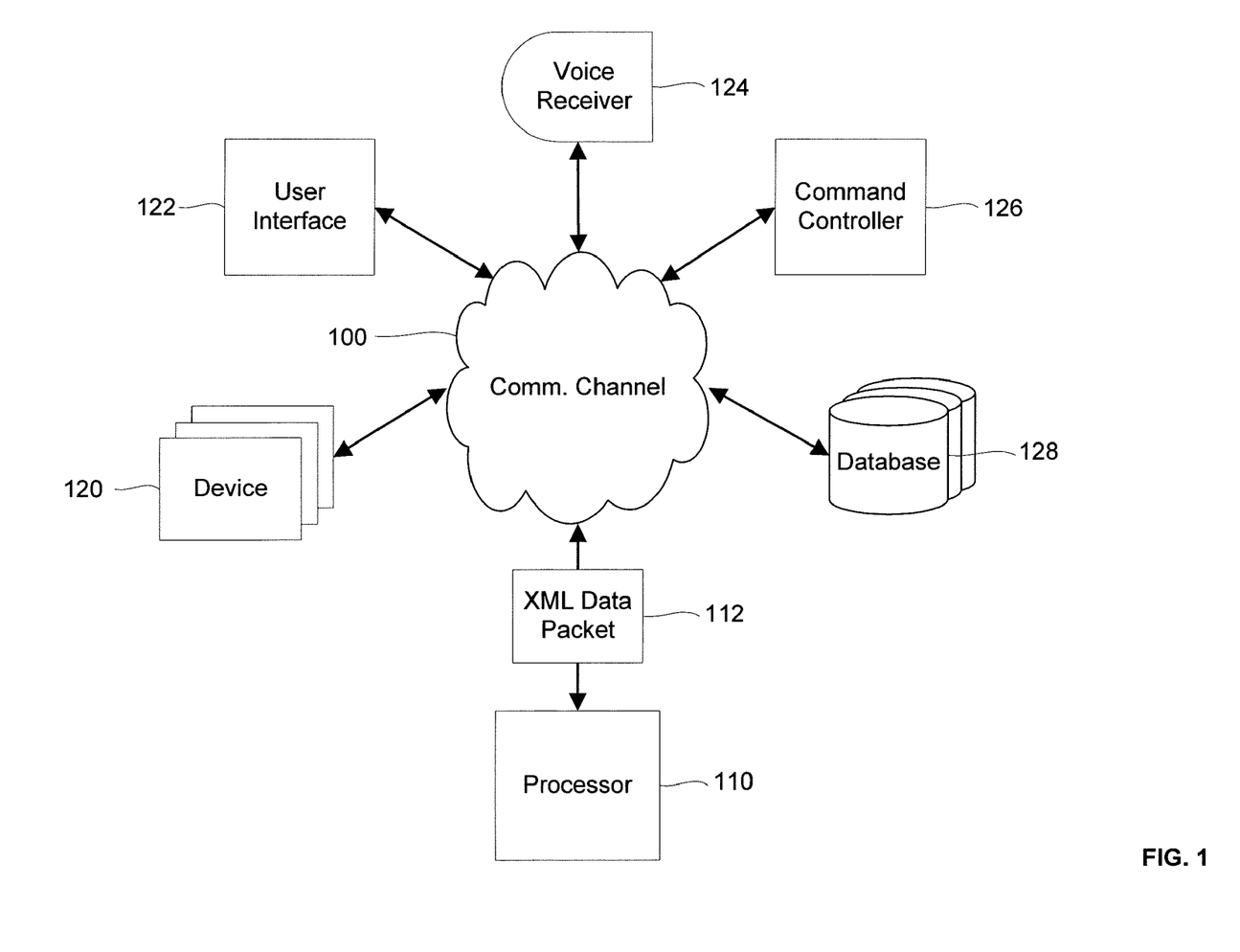
FIG. 1 is a schematic view of a device control system according to the present invention.

FIG. 1 shows a device control system according to the present invention. The system may be any type of device control system, such as device control system utilizing a voice recognition interface. The system may be useful for any number of applications including, for example, control of devices and/or processes in a medical operating room. The system may further be useful for any number of industrial and/or scientific applications.

The system includes a communication channel 100. The communication channel 100 may be, for example, a bus, a local area network ("LAN"), wide-area network ("WAN"), serial channel, a software pipe, or other suitable hardware and/or software means that enables the communication between two or more components. The system further includes at least one processor 110. The processor 110 may be any device, system, or part thereof that controls at least one operation or receives and/or execute one or more software programs, such as an eXtensible Markup Language processor. The processor 110 may, for example, be one of a digital signal processor, a microcontroller, a microprocessor, or a computer programmable logic device. It should be noted that the functionality associated with the processor 110 may be centralized or distributed, whether locally or remotely. For example, the processor 110 may be a centralized processor (e.g., in a server of the system), or may be distributed in one or more components or devices of the system.

As shown in FIG. 1, the system includes at least one device 120. A device 120 may be any device or group of devices operable or controllable by the system. For example, the device 120 may be medical device, instrument, tool or system, e.g., for use in an operating room. The device 120 may further be a scientific or industrial device, instrument, tool or system. Each of the devices 120 may receive and react to commands from the system (e.g., command controller 126).

The system further includes any number of other components or communication components. For example, the system may include a user interface 122. The user interface 122 may be, for example, a graphical user interface and/or touchscreen interface. The user interface 122 may display or otherwise provide information or feedback to a user and/or receive input or information from the user. For example, the user interface 122 may include any number of elements such as a monitor or display, a keypad, a keyboard, a touch-screen, a mouse, and/or an audio output for providing and receiving information.

The system may also include a voice receiver 124 for receiving voice and/or speech input. The receiver 124 may be any instrument or device for receiving an incoming sound or sound wave and converting it into a digital waveform and/or an electric current or electric energy (e.g., voice interface data). For example, the receiver 124 may be a microphone. The speech input received by the receiver 124 may be any spoken utterance from a user such as a spoken word or phrase, or a collection of words or phrases. The speech input preferably includes words or phrases indicative of one or more commands which a user desires to be communicated to and/or implemented by the system. The system may also include a speech recognizer or speech recognition module for interpreting and/or processing the speech input (not shown).

Further included in the device control system may be at least one command controller 126 for implementing device commands and/or communicating with any number of devices of systems. The command controller 126 may be embodied in hardware, software or a combination thereof. The command controller 126 may implement an action or generate system or device commands based on a voice or speech input, or an input received via the user interface 122. The command controller 126 may further send command data to a device 120 or application operable by the system and/or the particular command. The system may also include any number of databases 128, e.g., for storing software applications, XML document type definitions, and XML documents, and/or data (e.g., language models, device data, user data, etc.) associated with the system.

Figure 2:
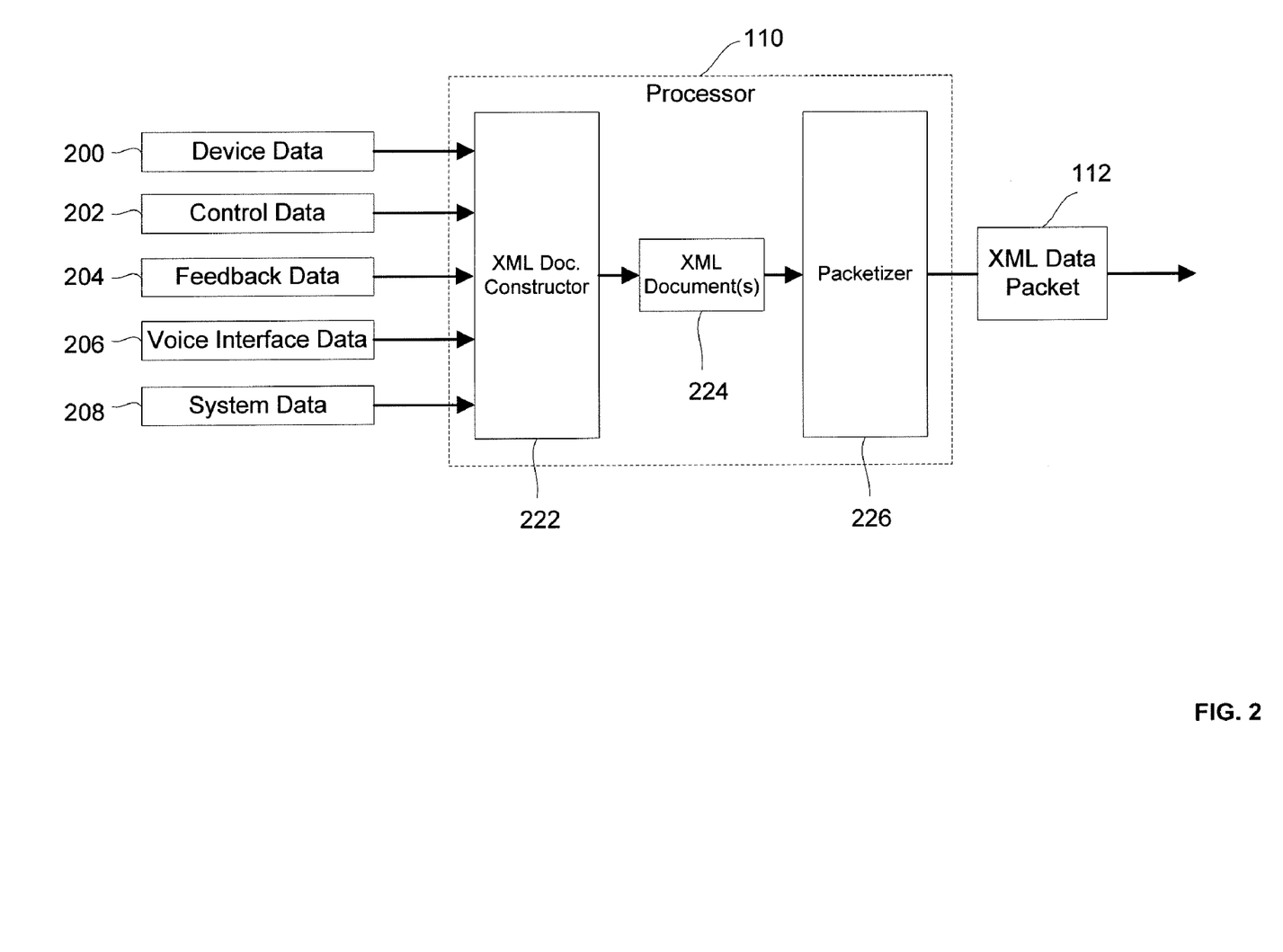
FIG. 2 is another schematic view of the device control system shown in FIG. 1.

As will be understood from the description herein, the device control system according to the present invention employs extensible Markup Language ("XML") as a platform for defining information resources and exchanges. As shown in FIG. 2, the one or more processors 110 of the system may include various software executing thereon for constructing, analyzing and sending XML documents and/or data packets. For example, the processor 110 may include software 222 for receiving message data and constructing one or more XML documents 224. The software 222 may be a separate software application or module, or a portion of an XML processor application.

The message data may be any data or information to be exchanged between components and/or devices of the system. For example, the message data may include device data 200. The device data 200 may comprise a device version, device capabilities, manufacturer information, etc. Control data 202 may include control codes for invoking functionalities of a particular device, return codes for device responses, error checking protocols, etc. Feedback data 204 may be information related to feedback in the device control application such as specific audio/visual feedback associated with a device functionality, warning messages issued by the system when a malfunction occurs, or the verbosity level of the feedback provided by the system. Voice interface data 206 pertains to how a voice interaction is taken. For example, voice interface data 206 may include language identifiers, command menus associated with the devices, voice command rejection sensitivity settings, etc. System data 208 includes any other data definitions related to the operation of the system such as system bus data, visual display or user interface data, audio feedback channel data, initial settings, etc. The message data may further contain any data formats including, but not limited to multimedia data (e.g., image, sound, video) or active components (e.g., Java applets, ActiveX).

When message data is received by any one of the processors 110, an appropriate XML document type corresponding to the particular message data is identified or determined by the software 222. For example, the processor 110 may query and/or employ XML Document Type Definitions ("DTD"), e.g., in the database 128. The system may include any number of DTD's. In some embodiments, the system includes at least one DTD corresponding to each message data type identified above. As one of ordinary skill in the art will understand, a DTD may be internal to an XML document or external and referenced in the XML document. One or more XML documents 224 are then constructed based on the semantics definitions for the identified XML document type or types.

The XML document or documents 224 may be packetized by a XML packetizer 226 or packetizing software or module. The XML packetizer 226 may be a separate software application or module, or a portion of an XML processor application. The XML document 224 is packetized with appropriate heading and formatting based on the communication channel 100 to be used for delivering the message. An XML data packet 112 may then be sent or transmitted to an appropriate component or device of the system, or an external recipient.

Figure 3:
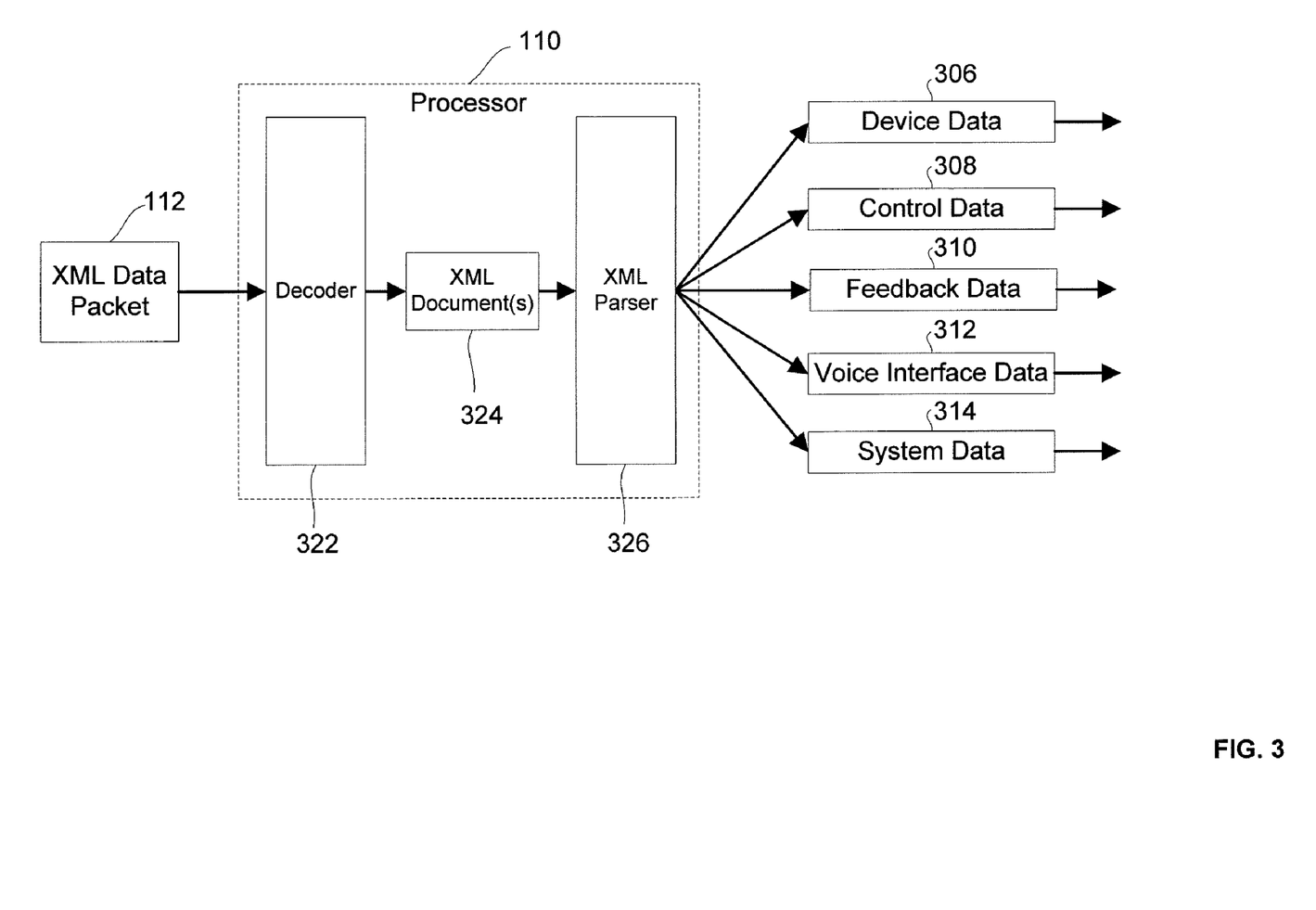
FIG. 3 is another schematic view of the device control system shown in FIG. 1.

FIG. 3 shows another view of the device control system of the present invention. In particular, FIG. 3 illustrates the analysis of a received XML message or data packet 112 by the processor 110. As shown, the XML data packet 112 is received by the processor 110. The processor 110 may, for example, be located in a particular component or device of the system, remote to the system, or in a system server. The processor 110 may include a XML decoder 322 or software executing on the processor for receiving and decoding the incoming XML data packet 112. The XML decoder 322 may be a separate software application or module, or a portion of an XML processor application.

The XML document or documents 324 may then be parsed by an XML parser 326. The XML parser 326 may be embodied in software, hardware or a combination of both and may further be a separate software application or module, or a portion of an XML processor application. The XML parser 326 determines a XML document type for the incoming message or XML document 324 and extracts data items or message data therefrom. The message data (e.g., 306-314) may then be utilized in further steps or operations by the system.

Figure 4:
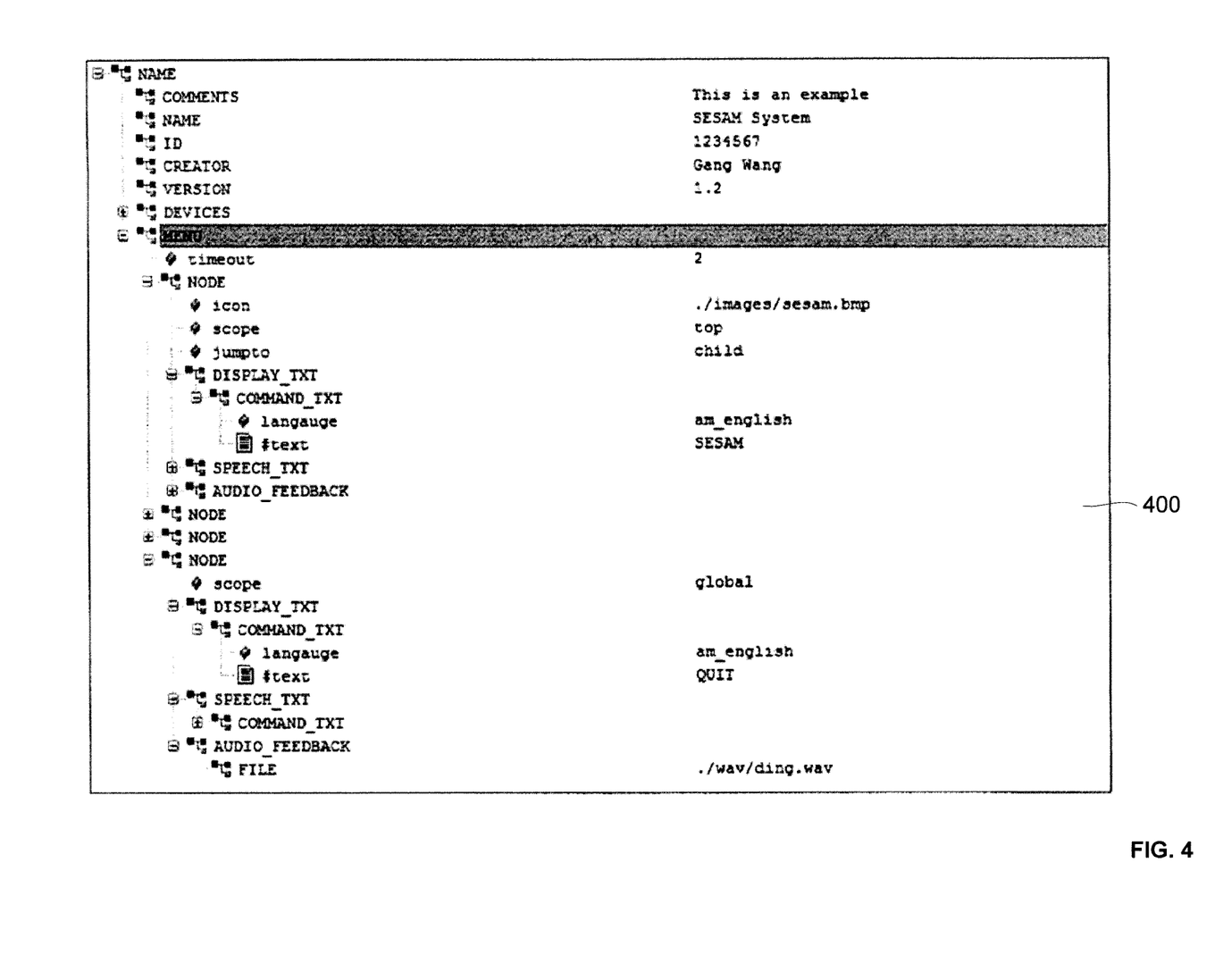
FIG. 4 is an exemplary command menu tree generated by the system shown in FIGS. 1-3.
Figure 5:
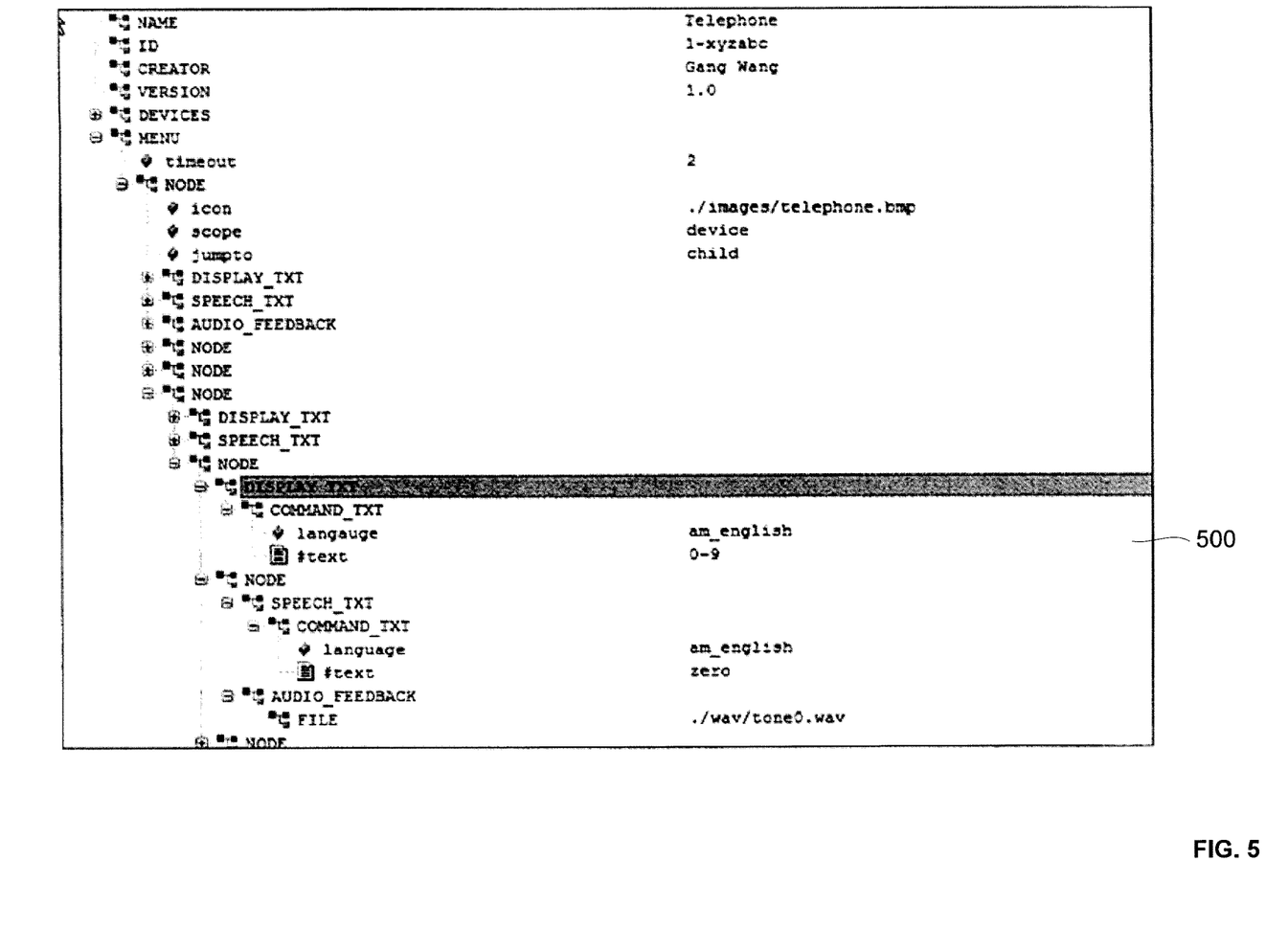
FIG. 5 is another exemplary command menu tree generated by the system shown in FIGS. 1-3.

FIGS. 4 and 5 show exemplary command menu trees 400/500 generated by the device system using XML. A device control system may include a tree-structured command menu associated with it. For example, a voice driven device control system includes a menu of possible voice or speech commands that may be implemented by the system. By giving voice commands, a user may navigate the menu. Device functions associated with the spoken or selected commands are executed and system responses or feedback (e.g., visual or audio) are provided.

To generate the exemplary menu shown in FIGS. 4 and 5, the system uses XML syntax. For example, the system may include a DTD for defining the menu tree. The DTD includes any number of elements as desired, including, e.g., Comments, Name, ID, Creator, Devices, Control, Menu, etc. For example, a Device element may include one or more devices 120 controllable by the system. A Control element may define what control trigger or command shall be sent to a particular device. The Menu element may include attributes to define each particular device's behavior in the menu. For example, an attribute may indicate how many seconds the system shall stay in each submenu.

The Menu element may further include a set of Node elements used to form the tree-structured menu. Node elements may include attributes such as "scope", "top", "icon", or "timeout." In the present example, the "scope" attributes defines where a submenu should be positioned. For example, a value of "top" indicates that the menu item will appear at the top of the system menu structure. A "global" menu item makes the command appear anywhere except the top level and a "device" menu item appears after a gateway word is called.

The attribute "jumpto" in the present example defines where the system should go after a menu command is called. For example, values for "jumpto" may include child, parent or top. Therefore, the menu position may be directed to the child menu of a current node, the parent level, or top level. An attribute "icon" may define an icon file name to be loaded for visualization purposes. An attribute "timeout" may be used to override a timeout defined in the Menu element and provide a node specific timeout value.

The DTD, or a Node element thereof, may further include any number of notification or feedback elements such as AUDIO-FEEDBACK, DISPLAY_TEXT, or SPEECH_TEXT. The AUDIO-FEEDBACK element defines if and what audio feedback is played when a command or menu is called. For example, as shown in FIG. 4, a file name "./wav/ding.wav is indicated. Likewise, the DISPLAY_TEXT element defines what text is visually displayed (e.g., on the user interface 122). The SPEECH_TEXT element defines what speech command is used for the particular menu node. Each feedback elements may further include multiple elements inside them such as different languages and multiple feedback alternatives. A feedback element can be a file or text to be fed to a synthesizer.

Figure 6:
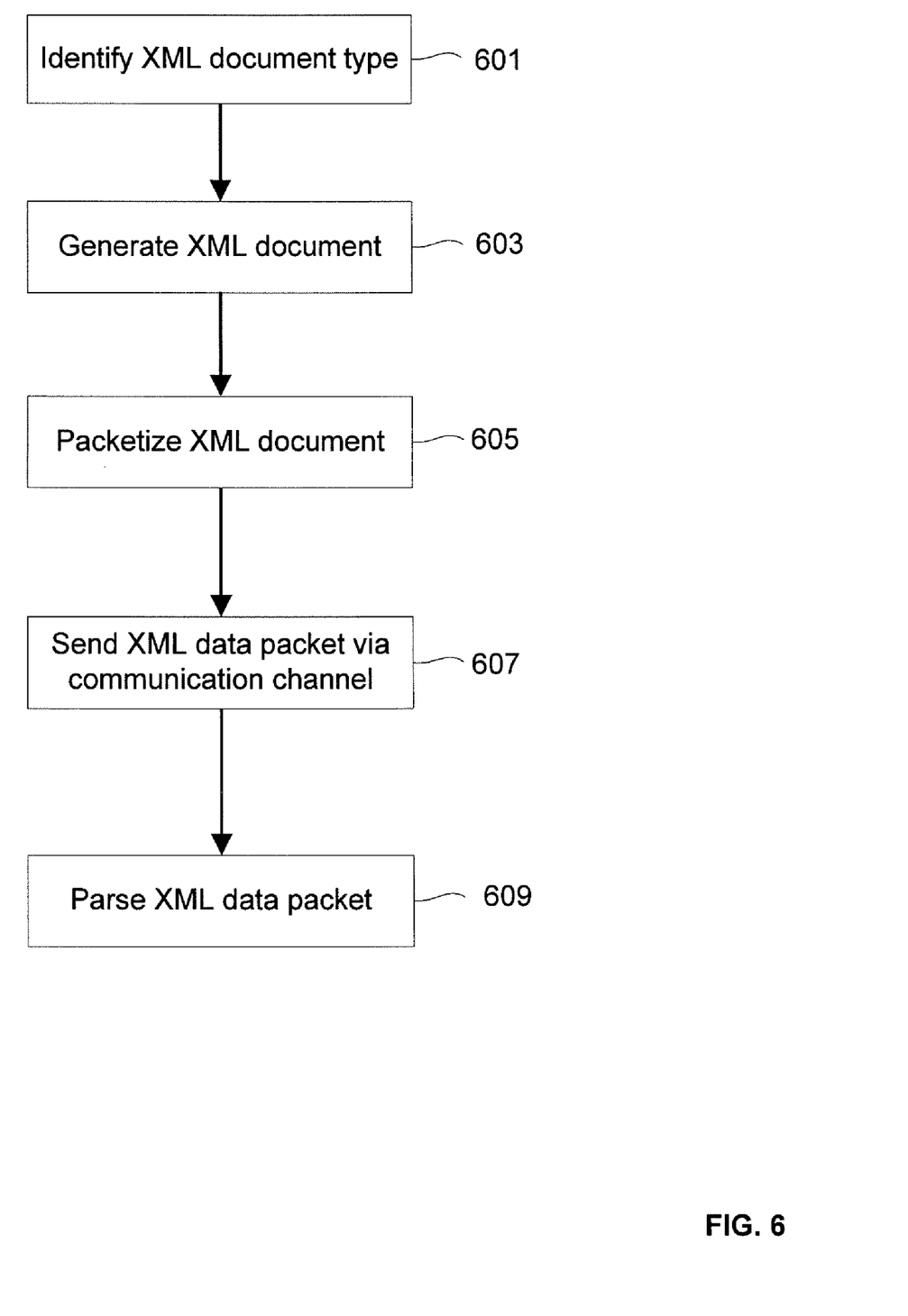
FIG. 6 is a method for exchanging information in a device control system employable by the system as shown in FIGS. 1-3.

FIG. 6 shows a method or process for exchanging information in a device control system, employable by the device control system of the present invention. The method includes a first step of identifying an appropriate XML document type, e.g., corresponding to received message data (step 601). The XML document type may be identified or determined, e.g., by querying any number of DTD's associated with the system. The semantics definition for the XML document type may further be determined. A XML document may then be generated, based on the determined XML document type and semantics definitions for the particular XML document type (step 603). In some embodiments, the XML document is then packetized (steps 605). The packetized XML document or XML data packet may be sent via a communications channel of the system (step 607). For example, a centralized processor or individual component of the system may send the packetized XML document to another component. Upon receipt of the XML data packet by another communications component or device of the system, the XML data packet is parsed and the message data extracted therefrom (step 609). The message data may then be distributed, implemented or otherwise employed by the system as necessary.

Although the invention has been described with reference to a particular arrangement of parts, features and the like, these are not intended to exhaust all possible arrangements or features, and indeed many modifications and variations will be ascertainable to those of skill in the art.

What is claimed is:

1. A medical device control system, comprising:
   at least one medical device operable by the system;
   a voice receiver for receiving speech commands;
   at least one processor;
   software executing on said at least one processor for receiving message data and determining a corresponding XML document type;
   software executing on said at least one processor for generating a XML document based on the XML document type, the XML document including the message data;
   software executing on said processor for packetizing the XML document;
   two or more communication components, each communication component comprising an XML parser for parsing the XML document and extracting the message data, wherein at least one of the communication components is a command controller for operating the at least one medical device, and wherein at least one of the components is a user interface;
   software executing on said processor for sending the packetized XML document via a communication channel to the communication components; and
   wherein the command controller generates XML documents in which the message data includes at least one control command, based on the speech commands received by said voice receiver, for operating the at least one medical device.

2. The system according to claim 1, wherein said software for determining the corresponding XML document type queries one or more document type definitions.

3. The system according to claim 2, wherein said software for generating the XML document generates the XML document based on at least one of the document type definitions.

4. The system according to claim 1, wherein each communication component further comprises:
a decoder for receiving and decoding the XML document.

5. The system according to claim 1, wherein at least one of the communication components includes the at least one processor.

6. The system according to claim 1, wherein at least one of the components is the voice receiver.

7. The system according to claim 1, wherein the message data includes at least one of device data, control data, and feedback data.

8. The system according to claim 1, wherein the message data includes multimedia data.

9. The system according to claim 1, wherein the message data includes settings for the system including at least one of initial settings and voice recognition sensitivity settings.

10. A medical device control system, comprising:
at least one medical device controllable by the system; and
a voice receiver for receiving speech commands;
two or more communication components, each communication component comprising:
a type identifier for determining an XML document type corresponding to message data based on one or more document type definitions;
an XML constructor for generating a XML document including the message data based on the XML document type;
a packetizer for packetizing the XML document; and
an XML parser for parsing the XML document and extracting the message data based on XML syntax; and
wherein at least one of the communication components is a command controller, wherein the command controller generates XML documents in which the message data includes at least one control command, based on the speech commands received by said voice receiver, for operating the at least one medical device; and
wherein at least one of the components is a user interface.

11. The system according to claim 10, further comprising:
software executing on each of the two or more communication components for sending the packetized XML document via a communication channel to at least one other of the communication components.

12. The system according to claim 10, wherein the message data includes at least one of device data, control data, feedback data, and system data.

13. The system according to claim 10, wherein the message data includes settings for the system including at least one of initial settings and voice recognition sensitivity settings.

14. A method for exchanging information in a medical device control system, comprising the steps of:
receiving, via a voice receiver, speech commands;
generating, via the command controller, message data including at least one command to operate the at least one medical device based on the speech commands;
receiving the message data from the command controller, wherein the message data includes the at least one command for operating at least one medical device;
determining, via one of two or more communication components, an XML document type based on the message data;
determining, via the one communication component, a document definition based on the XML document type;
generating, via the one communication component, an XML document including the message data based on the document definition;
packetizing, via the one communication component, the XML document; and
sending, via the one communication component, the packetized XML document to the at least one medical device via a communication channel,
wherein at least one of the two or more communication components is a user interface.

15. The method according to claim 14, further comprising the steps of:
receiving the packetized XML document from the communication channel;
parsing the XML document; and
extracting the message data based on XML syntax.

16. The method according to claim 14, wherein the message data further includes one of device data, control data, and feedback data.

* * * * *